US008711931B2

(12) United States Patent
Tanaka et al.

(10) Patent No.: US 8,711,931 B2
(45) Date of Patent: Apr. 29, 2014

(54) PICTURE INFORMATION CODING DEVICE AND CODING METHOD

(75) Inventors: Junichi Tanaka, Kanagawa (JP); Kazushi Sato, Kanagawa (JP); Yoichi Yagasaki, Tokyo (JP)

(73) Assignee: Sony Corporation, Tokyo (JP)

( * ) Notice: Subject to any disclaimer, the term of this patent is extended or adjusted under 35 U.S.C. 154(b) by 1272 days.

(21) Appl. No.: 12/524,733

(22) PCT Filed: Feb. 26, 2008

(86) PCT No.: PCT/JP2008/053248
§ 371 (c)(1),
(2), (4) Date: Jul. 28, 2009

(87) PCT Pub. No.: WO2008/105389
PCT Pub. Date: Sep. 4, 2008

(65) Prior Publication Data
US 2010/0118944 A1 May 13, 2010

(30) Foreign Application Priority Data

Feb. 28, 2007  (JP) .................................. 2007-050778

(51) Int. Cl.
H04N 7/18 (2006.01)
H04N 11/02 (2006.01)
H04N 11/04 (2006.01)

(52) U.S. Cl.
USPC ............ 375/240.12; 375/240.13; 375/240.14; 375/240.15; 375/240.16

(58) Field of Classification Search
USPC .......................... 375/240.12, 240.25, 240.26
See application file for complete search history.

(56) References Cited

U.S. PATENT DOCUMENTS 7,889,788 B2 * 2/2011 Toma et al. ................... 375/240
2004/0071354 A1 4/2004 Adachi et al.
(Continued)

FOREIGN PATENT DOCUMENTS

JP  2003 289544  10/2003
JP  2004 187264   7/2004
(Continued)

OTHER PUBLICATIONS

European Search Report issued Nov. 26, 2012 in European Patent Application No. 08711977.2.
(Continued)

Primary Examiner — Chikaodili E Anyikire
(74) Attorney, Agent, or Firm — Oblon, Spivak, McClelland, Maier & Neustadt, L.L.P.

(57) ABSTRACT

In a picture information coding device for outputting picture compression information based on an AVC encoding scheme, optimum reference relationships in a GOP structure including hierarchical B pictures can be obtained and random access from an I picture that is not an instantaneous decoding refresh picture can be performed.
When multiple-frame prediction is performed, with a memory management control operation command generation unit (13), a reference B picture that exists between a picture and a P picture or I picture is registered as a long-term reference picture using a memory management control operation command to manage a picture in a decoded picture buffer. The reference B picture is placed as the first in a reference picture list using a reference picture list reordering command when a B picture that exists between the P picture or I picture and the reference B picture is processed. The long-term reference picture in the decoded picture buffer is set to be a non-reference picture by setting the maximum value of a long-term frame index to [0] using a memory management control operation command when the P picture or I picture is processed. Random access from the I picture that is not an instantaneous decoding refresh picture is performed.

7 Claims, 18 Drawing Sheets

(56) References Cited

U.S. PATENT DOCUMENTS

| | | | |
|---|---|---|---|
| 2006/0056705 A1 | 3/2006 | Kadono et al. | |
| 2007/0116426 A1 | 5/2007 | Toma et al. | |
| 2007/0223575 A1* | 9/2007 | Wang et al. | 375/240.1 |
| 2009/0028247 A1* | 1/2009 | Suh et al. | 375/240.25 |
| 2009/0262804 A1* | 10/2009 | Pandit et al. | 375/240.12 |
| 2010/0046619 A1* | 2/2010 | Koo et al. | 375/240.12 |

FOREIGN PATENT DOCUMENTS

| | | |
|---|---|---|
| JP | 2004 248265 | 9/2004 |
| JP | 2004 274694 | 9/2004 |
| JP | 2004 274732 | 9/2004 |
| JP | 2004 289808 | 10/2004 |
| JP | 2006 129177 | 5/2006 |
| WO | 2005 107253 | 11/2005 |

OTHER PUBLICATIONS

Heiko Schwarz, et al., "Hierarchical B pictures", Joint Video Team (JVT) of ISO/IEC MPEG & ITU-T VCEG, $16^{th}$ meeting, No. JVT-P014, XP030006056, Jul. 23-29, 2005, pp. 1-25.

Miska M. Hannuksela, "Random Access and Time Information: Appendix A. Proposed Changes to Joint Model", Joint Video Team (JVT) of ISO/IEC MPEG & ITU-T VCEG, $2_{nd}$ meeting, No. JV-B109, XP030005106, Jan. 29- Feb. 1, 2002, pp. 1-8.

* cited by examiner

FIG. 4

| POC%16 | MMCO command | Details |
|---|---|---|
| 0 | 400 | Set long-term reference pictures to be unused for Reference |
| -2 | 41600 | Set max_long_term_frame_index=0 (which indicates one frame), and set Bs to be picture with Long_term_frame_index = 0 |
| 4 | 400 | Set long-term reference pictures to be unused for Reference |
| 3 | 41600 | Set max_long_term_frame_index=0 (which indicates one frame), and set Bs to be picture with Long_term_frame_index = 0 |
| 8 | 400 | Set long-term reference pictures to be unused for Reference |
| 6 | 41600 | Set max_long_term_frame_index=0 (which indicates one frame), and set Bs to be picture with Long_term_frame_index = 0 |
| 12 | 400 | Set long-term reference pictures to be unused for Reference |
| 10 | 41600 | Set max_long_term_frame_index=0 (which indicates one frame), and set Bs to be picture with Long_term_frame_index = 0 |
| 14 | 41600 | Set max_long_term_frame_index=0 (which indicates one frame), and set Bs to be picture with Long_term_frame_index = 0 |

COMMAND = 0 NAL_MMCO_END
COMMAND = 1 NAL_MMCO_MARK_SHORT_TERM_PIC_UNUSED
COMMAND = 2 NAL_MMCO_MARK_LONG_TERM_PIC_UNUSED
COMMAND = 3 NAL_MMCO_ASSIGN_LONG_TERM_FRAME_INDEX
COMMAND = 4 NAL_MMCO_SPECIFY_MAX_LONG_TERM_FRAME_INDEX
COMMAND = 5 NAL_MMCO_RESET_ALL_REF_PIC
COMMAND = 6 NAL_MMCO_ASSIGN_LONG_TERM_FRAME_INDEX_CURRENT

FIG. 5

| POC%16 | list | ref_pic_list_reordering | Details |
|---|---|---|---|
| -3 | 1 | 20213 | Set RefPicList0[0] to be equal to long-term reference picture with LongTermPicNum = 1 |
| -1 | 0 | 20213 | Set RefPicList0[0] to be equal to long-term reference picture with LongTermPicNum = 1 |
| 1 | 1 | 20213 | Set RefPicList0[0] to be equal to long-term reference picture with LongTermPicNum = 1 |
| 3 | 0 | 20213 | Set RefPicList0[0] to be equal to long-term reference picture with LongTermPicNum = 1 |
| 5 | 1 | 20213 | Set RefPicList0[0] to be equal to long-term reference picture with LongTermPicNum = 1 |
| 7 | 0 | 20213 | Set RefPicList0[0] to be equal to long-term reference picture with LongTermPicNum = 1 |
| 9 | 1 | 20213 | Set RefPicList0[0] to be equal to long-term reference picture with LongTermPicNum = 1 |
| 11 | 0 | 20213 | Set RefPicList0[0] to be equal to long-term reference picture with LongTermPicNum = 1 |
| 13 | 1 | 20213 | Set RefPicList0[0] to be equal to long-term reference picture with LongTermPicNum = 1 |
| 15 | 0 | 20213 | Set RefPicList0[0] to be equal to long-term reference picture with LongTermPicNum = 1 |

COMMAND = 0 NAL_REORDERING_ABS_DIFF_PIC_NUM_NEGATIVE
COMMAND = 1 NAL_REORDERING_ABS_DIFF_PIC_NUM_POSITIVE
COMMAND = 2 NAL_REORDERING_LONG_TERM_PIC_NUM
COMMAND = 3 NAL_REORDERING_END

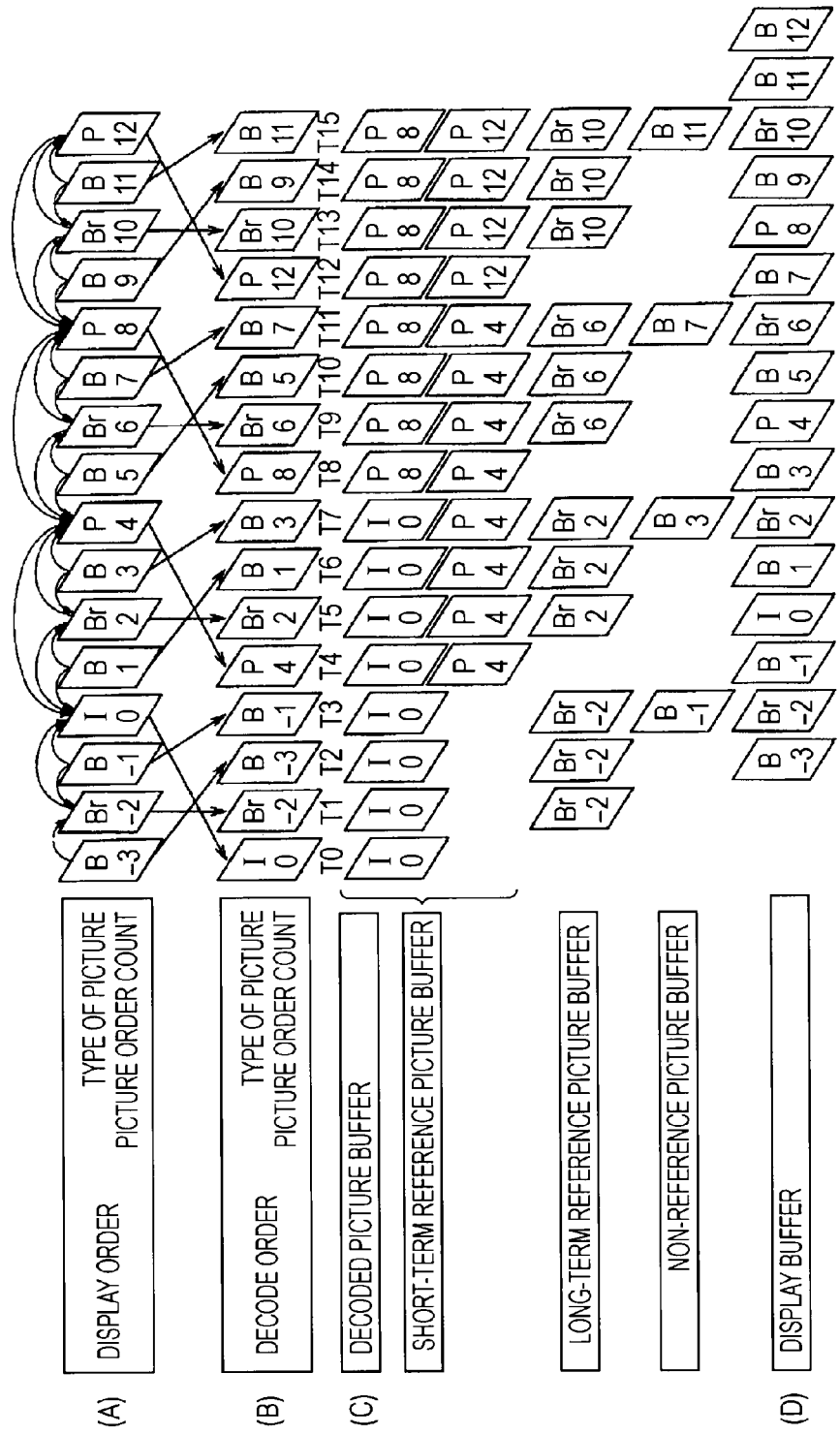

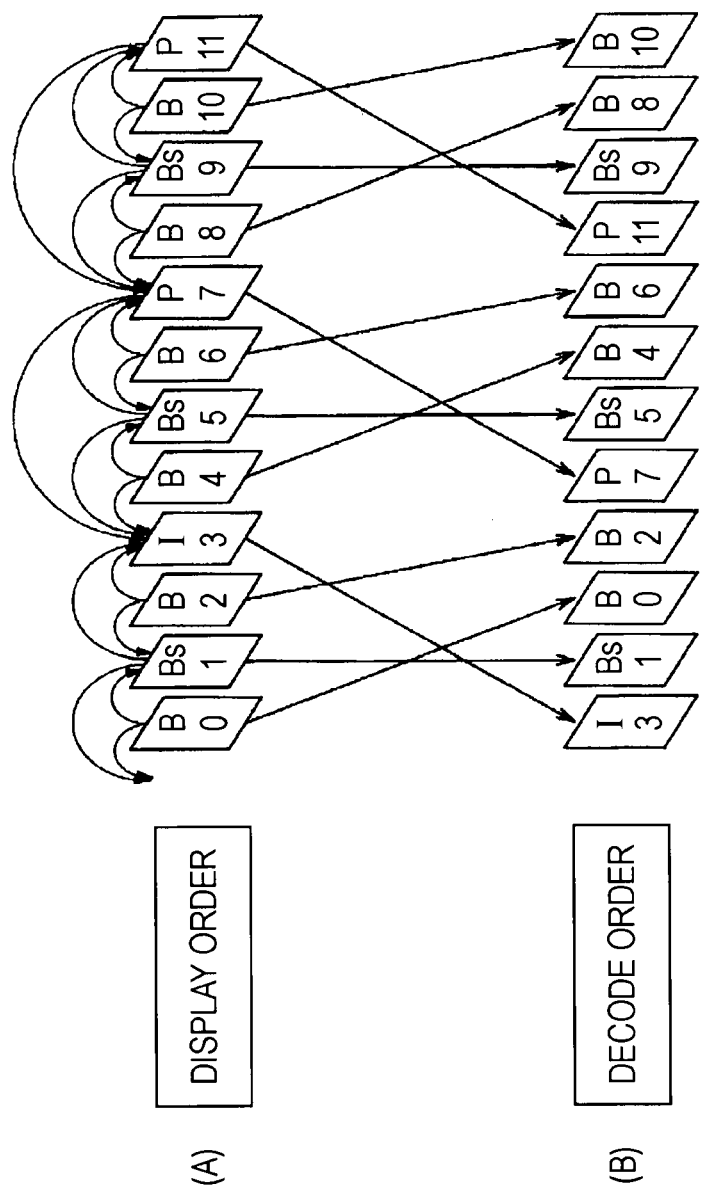

FIG. 10

| POC%32 | MMCO command | Details |
|---|---|---|
| 0 | 400 | Set long-term reference pictures to be unused for Reference |
| -3 | 41300600 | Set max_long_term_frame_index=0 (which indicates one frame), and set Bs top and Bs bot to be pictures with Long_term_frame_index = 0 |
| 8 | 400 | Set long-term reference pictures to be unused for Reference |
| 5 | 41300600 | Set max_long_term_frame_index=0 (which indicates one frame), and set Bs top and Bs bot to be pictures with Long_term_frame_index = 0 |
| 16 | 400 | Set long-term reference pictures to be unused for Reference |
| 13 | 41300600 | Set max_long_term_frame_index=0 (which indicates one frame), and set Bs top and Bs bot to be pictures with Long_term_frame_index = 0 |
| 24 | 400 | Set long-term reference pictures to be unused for Reference |
| 21 | 41300600 | Set max_long_term_frame_index=0 (which indicates one frame), and set Bs top and Bs bot to be pictures with Long_term_frame_index = 0 |
| 29 | 41300600 | Set max_long_term_frame_index=0 (which indicates one frame), and set Bs top and Bs bot to be pictures with Long_term_frame_index = 0 |

\# COMMAND = 0 NAL_MMCO_END
\# COMMAND = 1 NAL_MMCO_MARK_SHORT_TERM_PIC_UNUSED
\# COMMAND = 2 NAL_MMCO_MARK_LONG_TERM_PIC_UNUSED
\# COMMAND = 3 NAL_MMCO_ASSIGN_LONG_TERM_FRAME_INDEX
\# COMMAND = 4 NAL_MMCO_SPECIFY_MAX_LONG_TERM_FRAME_INDEX
\# COMMAND = 5 NAL_MMCO_RESET_ALL_REF_PIC
\# COMMAND = 6 NAL_MMCO_ASSIGN_LONG_TERM_FRAME_INDEX_CURRENT

FIG. 11

| POC%32 | list | ref_pic_list_reordering | Details |
|---|---|---|---|
| -6 | 1 | 20213 | Set RefPicList0[0] to be equal to long-term reference picture with LongTermPicNum = 1, and set RefPicList0[1] to be equal to long-term reference picture with LongTermPicNum = 0 |
| -5 | 1 | 20213 | Set RefPicList0[0] to be equal to long-term reference picture with LongTermPicNum = 1, and set RefPicList0[1] to be equal to long-term reference picture with LongTermPicNum = 0 |
| -2 | 0 | 20213 | Set RefPicList0[0] to be equal to long-term reference picture with LongTermPicNum = 1, and set RefPicList0[1] to be equal to long-term reference picture with LongTermPicNum = 0 |
| -1 | 0 | 20213 | Set RefPicList0[0] to be equal to long-term reference picture with LongTermPicNum = 1, and set RefPicList0[1] to be equal to long-term reference picture with LongTermPicNum = 0 |
| 1 | 0 | 003 | Set picture number for I picture |
| 2 | 1 | 20213 | Set RefPicList0[0] to be equal to long-term reference picture with LongTermPicNum = 1, and set RefPicList0[1] to be equal to long-term reference picture with LongTermPicNum = 0 |
| 3 | 1 | 20213 | Set RefPicList0[0] to be equal to long-term reference picture with LongTermPicNum = 1, and set RefPicList0[1] to be equal to long-term reference picture with LongTermPicNum = 0 |
| 6 | 0 | 20213 | Set RefPicList0[0] to be equal to long-term reference picture with LongTermPicNum = 1, and set RefPicList0[1] to be equal to long-term reference picture with LongTermPicNum = 0 |
| 7 | 0 | 20213 | Set RefPicList0[0] to be equal to long-term reference picture with LongTermPicNum = 1, and set RefPicList0[1] to be equal to long-term reference picture with LongTermPicNum = 0 |
| 10 | 1 | 20213 | Set RefPicList0[0] to be equal to long-term reference picture with LongTermPicNum = 1, and set RefPicList0[1] to be equal to long-term reference picture with LongTermPicNum = 0 |
| 11 | 1 | 20213 | Set RefPicList0[0] to be equal to long-term reference picture with LongTermPicNum = 1, and set RefPicList0[1] to be equal to long-term reference picture with LongTermPicNum = 0 |
| 14 | 0 | 20213 | Set RefPicList0[0] to be equal to long-term reference picture with LongTermPicNum = 1, and set RefPicList0[1] to be equal to long-term reference picture with LongTermPicNum = 0 |
| 15 | 0 | 20213 | Set RefPicList0[0] to be equal to long-term reference picture with LongTermPicNum = 1, and set RefPicList0[1] to be equal to long-term reference picture with LongTermPicNum = 0 |
| 18 | 1 | 20213 | Set RefPicList0[0] to be equal to long-term reference picture with LongTermPicNum = 1, and set RefPicList0[1] to be equal to long-term reference picture with LongTermPicNum = 0 |
| 19 | 1 | 20213 | Set RefPicList0[0] to be equal to long-term reference picture with LongTermPicNum = 1, and set RefPicList0[1] to be equal to long-term reference picture with LongTermPicNum = 0 |
| 22 | 0 | 20213 | Set RefPicList0[0] to be equal to long-term reference picture with LongTermPicNum = 1, and set RefPicList0[1] to be equal to long-term reference picture with LongTermPicNum = 0 |
| 23 | 0 | 20213 | Set RefPicList0[0] to be equal to long-term reference picture with LongTermPicNum = 1, and set RefPicList0[1] to be equal to long-term reference picture with LongTermPicNum = 0 |
| 26 | 1 | 20213 | Set RefPicList0[0] to be equal to long-term reference picture with LongTermPicNum = 1, and set RefPicList0[1] to be equal to long-term reference picture with LongTermPicNum = 0 |
| 27 | 1 | 20213 | Set RefPicList0[0] to be equal to long-term reference picture with LongTermPicNum = 1, and set RefPicList0[1] to be equal to long-term reference picture with LongTermPicNum = 0 |
| 30 | 0 | 20213 | Set RefPicList0[0] to be equal to long-term reference picture with LongTermPicNum = 1, and set RefPicList0[1] to be equal to long-term reference picture with LongTermPicNum = 0 |
| 31 | 0 | 20213 | Set RefPicList0[0] to be equal to long-term reference picture with LongTermPicNum = 1, and set RefPicList0[1] to be equal to long-term reference picture with LongTermPicNum = 0 |

\# COMMAND = 0 NAL_REORDERING_ABS_DIFF_PIC_NUM_NEGATIVE
\# COMMAND = 1 NAL_REORDERING_ABS_DIFF_PIC_NUM_POSITIVE
\# COMMAND = 2 NAL_REORDERING_LONG_TERM_PIC_NUM
\# COMMAND = 3 NAL_REORDERING_END

PICTURE INFORMATION CODING DEVICE AND CODING METHOD

TECHNICAL FIELD

The present invention relates to a picture information coding device and a coding method that are used when picture information (a bit stream) which has been compressed using orthogonal transformation, such as discrete cosine transformation or Karhunen-Loeve transformation, and using motion compensation as in the case of MPEG, H. 26x, or the like is received via a network medium such as satellite broadcasting, cable TV, the Internet, or a mobile phone or is processed on a storage medium such as an optical or magnetic disk, or a flash memory. Japanese Patent Application No. 2007-050778 is a patent application that was applied in Japan on Feb. 28, 2007, and, considering Japanese Patent Application No. 2007-050778 as a basic application, the present application is an application that claims the priority of Japanese Patent Application No. 2007-050778, which is incorporated by reference in the present application.

BACKGROUND ART

In recent years, devices, which treat picture information as digital data, which, in such a case, aim to transmit and store information with a high efficiency, and which adhere to a scheme, such as MPEG, for compressing picture information using orthogonal transformation, such as discrete cosine transformation, and using motion compensation by utilizing redundancy that is unique to the picture information have become widespread in both information distribution by broadcasting stations and information reception by ordinary homes.

In particular, MPEG2 (ISO/IEC 13818-2), which is defined as a general picture coding scheme, is a standard covering both interlaced scan pictures and progressive scan pictures, and standard resolution pictures and high-definition pictures, and is currently widely used in a wide variety of applications including professional applications and consumer applications. Using an MPEG2 compression scheme, for example, a coding rate (a bit rate) of 4 to 8 Mbps is assigned in a case of a standard-resolution interlaced scan picture having 720×480 pixels, and a coding rate of 18 to 22 Mbps is assigned in a case of a high-resolution interlaced scan picture having 1920×1088 pixels, whereby a high compression ratio and an excellent picture quality can be realized.

MPEG2 was mainly intended for high-picture-quality coding suitable for broadcasting, but was not compatible with a coding scheme for realizing a coding rate (a bit rate) lower than that determined in MPEG1, i.e., a higher compression ratio. It was considered that needs of such a coding scheme will increase in the future as mobile terminals become widespread, and an MPEG4 coding scheme was standardized for the increasing needs. Regarding a picture coding scheme, the specification of the scheme was approved as an ISO/IEC 14496-2 international standard in December, 1998.

Furthermore, in recent years, standardization of a standard called H. 26L (ITU-T Q6/16 VCEG), which originally aimed to code pictures that are used for teleconferences, has been in progress. It is known that, although H. 26L requires a larger amount of computation for coding and decoding the pictures, compared with a conventional coding scheme such as MPEG2 or MPEG4, a higher coding efficiency is realized with H. 26L. Additionally, currently, as part of MPEG4 activities, standardization for realizing a higher coding efficiency has been performed as Joint Model of Enhanced-Compression Video Coding on the basis of H. 26L by incorporating functions that are not supported in H. 26L. Regarding a schedule of standardization, an international standard called H. 264 and MPEG-4 Part 10 (Advanced Video Coding) was set in March, 2003.

FIG. 13 is a block diagram showing a schematic configuration of a picture information coding device 100 that outputs picture compression information based on the AVC standard.

The picture information coding device 100 includes an A/D converter unit 101, a screen rearrangement buffer 102, an adder 103, an orthogonal transformation unit 104, a quantization unit 105, a lossless coding unit 106, a storage buffer 107, a dequantization unit 108, an inverse orthogonal transformation unit 109, a deblocking filter 110, a frame memory 111, an intra-prediction unit 112, a motion prediction/compensation unit 113, a rate control unit 114, and so forth.

In the picture information coding device 100 shown in FIG. 13, the A/D converter unit 101 converts an input picture signal to a digital signal, and supplies the digital signal to the screen rearrangement buffer 102. Then, the screen rearrangement buffer 102 performs frame rearrangement in accordance with a group-of-pictures (GOP) structure of picture compression information that is to be output from the picture information coding device 100.

Here, regarding picture information on which intra-coding, i.e., coding using a single frame, is to be performed, difference information concerning the difference between input picture information and pixel values that are generated by the intra-prediction unit 112 is input to the orthogonal transformation unit 104. Then, the difference information is subjected to orthogonal transformation, such as discrete cosine transformation or Karhunen-Loeve transformation, by the orthogonal transformation unit 104. The orthogonal transformation unit 104 supplies a transformation coefficient that is obtained by orthogonal transformation to the quantization unit 105.

The quantization unit 105 performs a quantization process on the transformation coefficient that is supplied from the orthogonal transformation unit 104, and supplies the quantized transformation coefficient to the lossless coding unit 106.

The lossless coding unit 106 performs lossless coding, such as variable length coding or arithmetic coding, on the quantized transformation coefficient that is supplied from the quantization unit 105. The transformation coefficient that is lossless-coded by the lossless coding unit 106 is stored in the storage buffer 107, and output as the picture compression information.

The behavior of the quantization unit 105 is controlled by the rate control unit 114. Furthermore, the quantization unit 105 supplies the quantized transformation coefficient to the dequantization unit 108. Moreover, the quantized transformation coefficient is subjected to an inverse orthogonal transformation process by the inverse orthogonal transformation unit 109, thereby being transformed to decoded picture information. After the information is subjected to removal of block noise by the deblocking filter 110, the information is stored in the frame memory 111. Information concerning an intra-prediction mode that is applied to blocks/macro blocks in the intra-prediction unit 112 is transmitted to the lossless coding unit 106, and coded as a portion of header information in the picture compression information.

On the other hand, regarding picture information on which inter-coding, i.e., coding using a plurality of frames, is to be performed, picture information that is supplied from the screen rearrangement buffer 102 is input to the motion prediction/compensation unit 113. The motion prediction/compensation unit 113 reads, from the frame memory 111, picture information that is to be simultaneously referred to. The motion prediction/compensation unit 113 performs a motion prediction/compensation process to generate reference picture information, and supplies the reference picture information to the adder 103. The adder 103 transforms the picture information, which is supplied from the screen rearrangement buffer 102, to a difference signal representing the difference between the picture information and the reference picture information. The motion prediction/compensation unit 113 simultaneously supplies motion-vector information to the lossless coding unit 106. The lossless coding unit 106 performs a lossless coding process, such as variable length coding or arithmetic coding, on the motion-vector information, and forms information that is to be inserted into a header portion of picture compression information. The other processes are the same as the processes related to the picture compression information that is subjected to intra-coding.

FIG. 14 is a block diagram showing a schematic configuration of a picture information decoding device 200 that realizes picture compression using orthogonal transformation, such as discrete cosine transformation or Karhunen-Loeve transformation, and using motion compensation.

The picture information decoding device 200 includes a storage buffer 201, a lossless decoding unit 202, a dequantization unit 203, an inverse orthogonal transformation unit 204, an adder 205, a screen rearrangement buffer 206, a D/A converter unit 207, a frame memory 208, a motion prediction/compensation unit 209, an intra-prediction unit 210, a deblocking filter 211, and so forth.

In the picture information decoding device 200 shown in FIG. 14, the storage buffer 201 temporarily stores input picture compression information, and transfers the stored picture compression information to the lossless decoding unit 202. The lossless decoding unit 202 performs a process such as variable length decoding or arithmetic decoding on the picture compression information, which is transferred from the storage buffer 201, in accordance with a determined format of picture compression information. Furthermore, when a frame is an intra-coded frame, the lossless decoding unit 202 also decodes intra-prediction mode information that is stored in a header portion of the picture compression information, and supplies the information to the intra-prediction unit 210. Moreover, when the frame is an inter-coded frame, the lossless decoding unit 202 also decodes motion-vector information that is stored in the header portion of the picture compression information, and supplies the information to the motion prediction/compensation unit 209.

The dequantization unit 203 dequantizes a quantized transformation coefficient that is supplied from the lossless decoding unit 202, and supplies the transformation coefficient to the inverse orthogonal transformation unit 204 as a transformation coefficient. The inverse orthogonal transformation unit 204 performs, in accordance with a predetermined scheme, fourth-order inverse orthogonal transformation on the transformation coefficient that is supplied from the dequantization unit 203.

Here, when the frame is an intra-coded frame, picture information that has been subjected to an inverse orthogonal transformation process is supplied to the adder 205, and combined with prediction picture information that is generated by the intra-prediction unit 210. Furthermore, after the information is subjected to removal of block noise by the deblocking filter 211, the information is stored in the screen rearrangement buffer 206. The information is output after a D/A conversion process is performed by the D/A converter unit 207.

On the other hand, when the frame is an inter-coded frame, the motion prediction/compensation unit 209 generates reference picture information on the basis of the motion-vector information, which has been subjected to a lossless decoding process by the lossless decoding unit 202, and on the basis of picture information that is stored in the frame memory 208, and supplies the reference picture information to the adder 205. The adder 205 combines the reference picture information with an output of the inverse orthogonal transformation unit 204. The other processes are the same as the processes related to the intra-coded frame.

Examples of documents of the conventional art for the present application include Japanese Unexamined Patent Application Publication No. 2003-289544, Japanese Unexamined Patent Application Publication No. 2004-289808, Japanese Unexamined Patent Application Publication No. 2004-274732, Japanese Unexamined Patent Application Publication No. 2004-187264, Japanese Unexamined Patent Application Publication No. 2004-274694, and Japanese Unexamined Patent Application Publication No. 2006-129177.

DISCLOSURE OF INVENTION

Technical Problem

Meanwhile, in an AVC encoding scheme, a plurality of pictures can be referred to. These pictures are saved in a decoded picture buffer (DPB) that is a picture buffer memory for storing decoded pictures which are used for prediction. In the decoded picture buffer (DPB), a picture that is referred to in a short term is marked as a short-term reference picture (used for short-term reference), a picture that is referred to over a long term is marked as a long-term reference picture (used for long-term reference), and a picture that is not referred to is marked as a non-reference picture (unused for reference), whereby each picture is marked.

Decoded pictures are saved in the decoded picture buffer (DPB) once. The decoded pictures are output at output timing that is specified using a rearranged output order.

The size of the decoded picture buffer (DPB) is defined by a profile and a level, and is defined not as the number of pictures but as an amount of bit. In other words, even when the same profile and level are used for definition, the number of pictures is changed in accordance with a picture frame for pictures. For example, in a case of a main profile and level 4, the maximum size (MaxDPB: Maximum Decoded Picture Buffer Size) of the picture buffer for storing decoded pictures that are used for prediction is 12288.0×1024 bytes. Accordingly, in a case of 1440×1088 and 4:2:0, the number of pictures that can be saved in the decoded picture buffer (DPB) is five. On the other hand, in a case of 1920×1088 and 4:2:0, the number of pictures that can be saved in the decoded picture buffer (DPB) is four. It is necessary to perform encoding using the limited size of the DPB so that there is no contradiction between an output order and reference relationships.

There are two types of management processes as processes for managing the decoded picture buffer (DPB). A first management process is a sliding window process. A second management process is an adaptive memory control process. The sliding window process is a process in which the decoded picture buffer (DPB) is managed using a first-in-first-out (FIFO) scheme, and in which pictures are released in an order of frame numbers (frame_num) from smaller ones. In the adaptive memory control process, pictures in the decoded picture buffer (DPB) can be managed in any manner. Management commands that are used in the adaptive memory control process are called memory management control operation (MMCO) commands. With the MMCO commands, for example, a short-term reference picture can be set to be a non-reference picture, a long-term reference picture can be set to be a non-reference picture, a short-term reference picture can be set to be a long-term reference picture by assigning a long-term frame index to the short-term reference picture, the maximum value of the long-term frame index can be set, and all reference pictures can be set to non-reference pictures.

In the adaptive memory control process, reference pictures are managed using a reference picture list. An order in the reference picture list can be replaced with any order using reference picture list reordering. When the reference picture list reordering is not used, the reference picture list is generated using an order from short-term reference pictures to long-term reference pictures.

A GOP structure that is called a hierarchical B-picture structure has attracted attention in terms of coding efficiency and picture quality because of recent years' researches. Parts (A) and (B) of FIG. 15 are diagrams showing an example of a typical hierarchical B-picture structure (GOP-1). In part (A) of FIG. 15, types of pictures and picture order counts (POCs) are shown in a display order, and reference relationships among the respective pictures are indicated by arrows. Furthermore, in part (B) of FIG. 15, a decode order of the respective pictures is shown. Additionally, in parts (A) and (B) of FIG. 15, Br denotes a B picture to be referred to.

However, because this structure requires a large number of rearrangement buffers, there is a case in which a GOP structure (GOP-2) such as a structure shown in FIG. 16 is used. In part (A) of FIG. 16, types of pictures and picture order counts (POCs) are shown in a display order, and reference relationships among the respective pictures are indicated by arrows. Furthermore, in part (B) of FIG. 16, the pictures are shown in a decode order. Additionally, in parts (A) and (B) of FIG. 16, Br denotes a B picture to be referred to. As described above, in a case of a main profile, level 4, and a picture frame of 1920×1088 and 4:2:0, the number of pictures that can be saved in the decoded picture buffer (DPB) is four.

In the GOP-2 structure, when the number of pictures that can be saved in the decoded picture buffer (DPB) is four (max_dec_frame_buffering=4) and the number of pictures that can be used for reference is three (num_ref_frames=3), reference relationships such as reference relationships shown in parts (A) to (D) of FIG. 17 are obtained.

In part (A) of FIG. 17, types of pictures and picture order counts are shown in a display order, and reference relationships among the respective pictures are indicated by arrows. Furthermore, in part (B) of FIG. 17, a decode order of the respective pictures is shown. Additionally, in parts (C) and (D) of FIG. 17, contents of the decoded picture buffer (a reference picture buffer and a non-reference picture buffer) and a display buffer at respective times T0, T1, . . . , T15, . . . are shown. In this case, as indicated by the arrows with thick lines in part (A) of FIG. 17, no reference surface that is temporally closest exists. Moreover, because reference is performed so that an I picture is skipped, random access from the I picture that is not an instantaneous decoding refresh picture cannot be performed.

Here, the IDR picture is a start picture in a picture sequence. An instantaneous decoding refresh picture includes an I slice or a switching I slice, and, with the instantaneous decoding refresh picture, all states that are required in order to decode a bit stream, such as a state of the reference picture buffer, a frame number, and a picture order count, are reset. In H. 264/AVC, because prediction between frames, in which a picture before an I picture is referred to from a P picture after the I picture, is allowed, a typical I picture is not sufficient in order to completely reset the states, and it is necessary to use the instantaneous decoding refresh picture.

As described above, with the conventional technique, a picture that is temporally closest and that is considered as a highly correlated picture cannot be referred to, and, additionally, the conventional technique has a problem that random access from an I picture which is not an instantaneous decoding refresh picture cannot be performed.

Therefore, in view of conventional problems such as the above-described problems, the present invention aims to realize, in a picture information coding device for outputting picture compression information based on the AVC encoding scheme, optimum reference relationships in a GOP structure including hierarchical B-pictures and random access from an I picture that is not an instantaneous decoding refresh picture.

Further other aims of the present invention and specific advantages that are obtained by the present invention will become more apparent from embodiments that are described below.

In order to solve the above-described issues, the present invention makes it possible, using processes with memory management control operation commands and reference picture list reordering commands, to obtain most efficient reference relationships and to perform random access from an I picture that is not an instantaneous decoding refresh picture.

In other words, the present invention provides a picture information coding device for performing a process of coding picture information using motion prediction and for outputting picture compression information. The device is characterized by including memory management control operation command generation means for generating memory management control operation commands to manage pictures in a decoded picture buffer. In a case in which multiple-frame prediction is performed, the memory management control operation command generation means registers a reference B picture that exists between a picture and a P picture or I picture as a long-term reference picture using a memory management control operation command, places the reference B picture as the first in a reference picture list using a reference picture list reordering command when a B picture that exists between the P picture or I picture and the reference B picture is processed, sets the long-term reference picture in the decoded picture buffer to be a non-reference picture by setting a maximum value of a long-term frame index to [0] using a memory management control operation command when the P picture or I picture is processed, and performs random access from the I picture that is not an instantaneous decoding refresh picture.

Furthermore, the present invention provides a picture information coding method for performing a process of coding picture information using motion prediction and for outputting picture compression information. The method is characterized by including the steps of: registering, in a case in which multiple-frame prediction is performed, a reference B picture that exists between a picture and a P picture or I picture as a long-term reference picture using a memory management control operation command to manage a picture in a decoded picture buffer; placing the reference B picture as the first in a reference picture list using a reference picture list reordering command when a B picture that exists between the P picture or I picture and the reference B picture is processed; setting the long-term reference picture in the decoded picture buffer to be a non-reference picture by setting a maximum value of a long-term frame index to [0] using a memory management control operation command when the P picture or I picture is processed; and performing random access from the I picture that is not an instantaneous decoding refresh picture.

Here, a principal of operation of the memory management control operation command generation means that characterizes the present invention will be described.

The memory management control operation command generation means is means for issuing memory management control operation commands and reference picture list reordering commands with which efficient reference relationships are realized in accordance with a GOP structure, and with which random access from an I picture that is not an instantaneous decoding refresh (IDR) picture can be performed. Here, a case in which a GOP structure such as a structure shown in FIG. 16 is provided, and in which the maximum number of decoded frame buffers (max_dec_frame_buffering) is four and the number of reference frames (num_ref_frames) is three is described as an example.

Because this structure requires a large number of rearrangement buffers, as described above, there is a case in which a GOP structure (GOP-2) such as the structure shown in FIG. 16 is used. As described above, in a case of a main profile, level 4, and a picture frame of 1920×1088 and 4:2:0, the number of pictures that can be saved in the decoded picture buffer (DPB) is four. And, in a case in which the decoded picture buffer (DPB) is four (max_dec_frame_buffering=4) and the number of pictures that can be used for reference is three (num_ref_frames=3) in the GOP-2 structure, reference relationships such as the reference relationships shown in parts (A) to (D) of FIG. 17 are obtained.

When no memory management control operation command is used, as shown in FIG. 17, reference to a reference B picture is performed for a B picture after a P picture or an I picture in a decode order in such a manner that the P picture or the I picture which is temporally immediately before the B picture is skipped. In order to avoid this, it is only necessary to set the reference B picture to be a non-reference picture using a memory management control operation command.

It is only necessary to set the previous reference B picture, which has been set to be a short-term reference picture, to be a non-reference picture using a memory management control operation command (MMCO=1) at a time of the reference B picture. However, in such a case, it is necessary to output, to a stream, a picture-number difference value representing the difference between a picture number of the reference B picture and a picture number at present at which the command is output. A picture number is determined using a frame number (frame_num) that exists on a slice header. A frame number is a value for uniquely determining a picture.

When random access from an I picture other than an instantaneous decoding refresh picture is performed, only values that are provided as frame numbers of pictures following the I picture exist. Accordingly, if setting of a picture to be a non-reference picture using the memory management control operation command (MMCO=1) is to be performed, no picture to be specified exists in the decoded picture buffer.

Therefore, in the present invention, a memory management control operation command of MMCO=4 to change the maximum value of the long-term frame index is used. In this case, when the maximum value of the long-term frame index is set to [0], a long-term reference picture that previously existed can be released from the decoded picture buffer. By utilizing this mechanism, a reference B picture is set to be a long-term reference picture, and then, at a time at which the long-term reference picture becomes unnecessary for reference, the long-term reference picture is released using the command to change the maximum value of the long-term frame index. In this manner, even when random access from an I picture other than an instantaneous decoding refresh picture is performed, a command having no contradiction can be issued.

When no reference picture list reordering command is used, the reference picture list is generated using an order from short-term reference pictures to long-term reference pictures. Accordingly, when a reference B picture is set to be a long-term reference picture, the last reference number in the list is assigned. Because this has a disadvantage in terms of coding efficiency, the smallest reference number is assigned using a reference picture list reordering command.

Reference relationships such as relationships shown in parts (A) to (D) of FIG. 6 can be realized by continuously performing the above-described processes.

BRIEF DESCRIPTION OF DRAWINGS

FIG. 4 is an illustration showing the details of memory management control operation commands that are used to perform the above-mentioned random access to a GOP having a frame structure in the above-mentioned picture information coding device.

FIG. 5 is an illustration showing the details of reference picture list reordering commands that are used to perform the above-mentioned random access to the GOP having a frame structure in the above-mentioned picture information coding device.

FIG. 6 is a diagram schematically showing a state of each information item in a case in which the above-mentioned random access to the GOP having a frame structure is performed in the above-mentioned picture information coding device.

FIG. 7 is a diagram schematically showing an example of a configuration of a GOP having a frame structure to which the above-mentioned random access is performed in the above-mentioned picture information coding device.

FIG. 10 is an illustration showing the details of memory management control operation commands that are used to perform the above-mentioned random access to the GOP having a field structure in the above-mentioned picture information coding device.

FIG. 11 is an illustration showing the details of reference picture list reordering commands that are used to perform the above-mentioned random access to the GOP having a field structure in the above-mentioned picture information coding device.

BEST MODES FOR CARRYING OUT THE INVENTION

Embodiments of the present invention will be described below in detail with reference to the drawings. Note that the present invention is not limited to examples given below. As a matter of course, any modification can be made without departing from the gist of the present invention.

Figure 1:
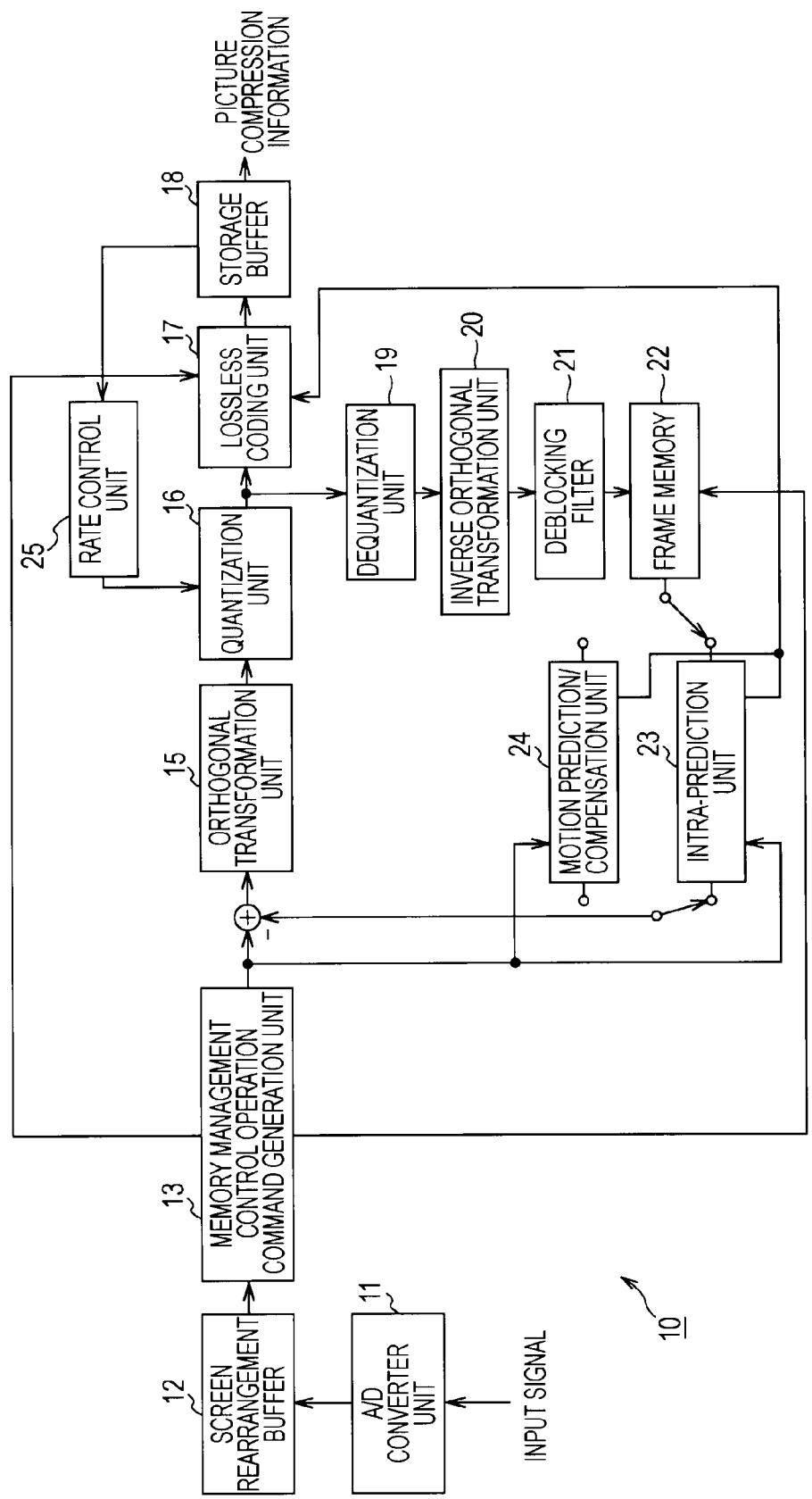
FIG. 1 is a block diagram showing an example of a configuration of a picture information coding device, which uses an AVC encoding scheme, according to the present invention.

The present invention is applied to a picture information coding device 10 having a configuration such as a configuration shown in FIG. 1.

The picture information coding device 10 includes an A/D converter unit 11, a screen rearrangement buffer 12, a memory management control operation (MMCO) command generation unit 13, an adder 14, an orthogonal transformation unit 15, a quantization unit 16, a lossless coding unit 17, a storage buffer 18, a dequantization unit 19, an inverse orthogonal transformation unit 20, a deblocking filter 21, a frame memory 22, an intra-prediction unit 23, a motion prediction/compensation unit 24, a rate control unit 25, and so forth.

In the picture information coding device 10 shown in FIG. 10, the A/D converter unit 11 converts an input moving picture signal to a digital signal, and supplies the digital signal to the screen rearrangement buffer 12.

The screen rearrangement buffer 102 performs frame rearrangement, in accordance with a group-of-pictures (GOP) structure of picture compression information that is to be output from the picture information coding device 10, on input picture information that is converted to the digital signal by the A/D converter unit 11. The screen rearrangement buffer 12 supplies the input picture information, in which frames have been rearranged, to the adder 14, the orthogonal transformation unit 15, the intra-prediction unit 23, and the motion prediction/compensation unit 24 via the memory management control operation command generation unit 13.

The MMCO command generation unit 13 issues, to the lossless coding unit 17 and the frame memory 22, MMCO commands and reference picture list reordering commands with which, for the input picture information that is supplied from the screen rearrangement buffer 12, for example, efficient reference relationships are realized in accordance with the group-of-pictures (GOP) structure, and with which random access from an I picture that is not an instantaneous decoding refresh (IDR) picture can be performed.

The adder 14 generates, for each macro block, a difference value representing the difference between the input picture information that is supplied via the MMCO command generation unit 13 and an intra- or inter-prediction picture information.

Here, regarding picture information on which intra-coding, i.e., coding using a single frame, is to be performed, a difference value representing the difference between the input picture information and the intra-prediction picture information that is generated by the intra-prediction unit 23 is input to the orthogonal transformation unit 15. Furthermore, regarding picture information on which inter-coding, i.e., coding using a plurality of frames, is to be performed, a difference value representing the difference between the input picture information and reference picture information that is generated by the motion prediction/compensation unit 24 is input to the orthogonal transformation unit 15.

The orthogonal transformation unit 15 performs orthogonal transformation, such as discrete cosine transformation or Karhunen-Loeve transformation, on a difference value for each macro block, which is supplied from the adder 14, in units of variable transformation sizes. Here, the orthogonal transformation unit 15 performs discrete cosine transform (DCT), and supplies an obtained orthogonal transformation (DCT) coefficient to the quantization unit 16.

The quantization unit 16 performs a quantization process on the transformation coefficient that is supplied from the orthogonal transformation unit 15, and supplies the quantized transformation coefficient to the lossless coding unit 17 and the dequantization unit 19.

The behavior of the quantization unit 16 is controlled by the rate control unit 25.

The lossless coding unit 17 performs lossless coding, such as variable length coding or arithmetic coding, e.g., CABAC (Context-Adaptive Binary Arithmetic Coding) encoding, on the quantized transformation coefficient that is supplied from the quantization unit 16. The transformation coefficient that is lossless-coded by the lossless coding unit 17 is stored in the storage buffer 18, and output as picture compression information.

Furthermore, the dequantization unit 19 performs a dequantization process on the quantized orthogonal transformation coefficient that is supplied from the quantization unit 16, and supplies the orthogonal transformation coefficient to the inverse orthogonal transformation unit 20.

The inverse orthogonal transformation unit 20 performs an inverse orthogonal transformation process on the orthogonal transformation coefficient that is supplied from the dequantization unit 19, and supplies obtained decoded picture information to the frame memory 22 via the deblocking filter 21.

The deblocking filter 21 removes block noise that is included in the decoded picture information.

The frame memory 22 stores the decoded picture information.

The intra-prediction unit 23 reads, from the frame memory 22, picture information that is adjacent and that has already been coded, and only performs, on the basis of the picture information, an intra-prediction process that is suitable for an orthogonal transformation size.

The motion prediction/compensation unit 24 searches the reference picture information for a motion vector, and performs generation of inter-prediction picture information.

The rate control unit 25 performs control of an operation of the quantization unit 16 using feedback control, and performs control of a coding rate for the picture compression information that is to be an output.

Figure 2:
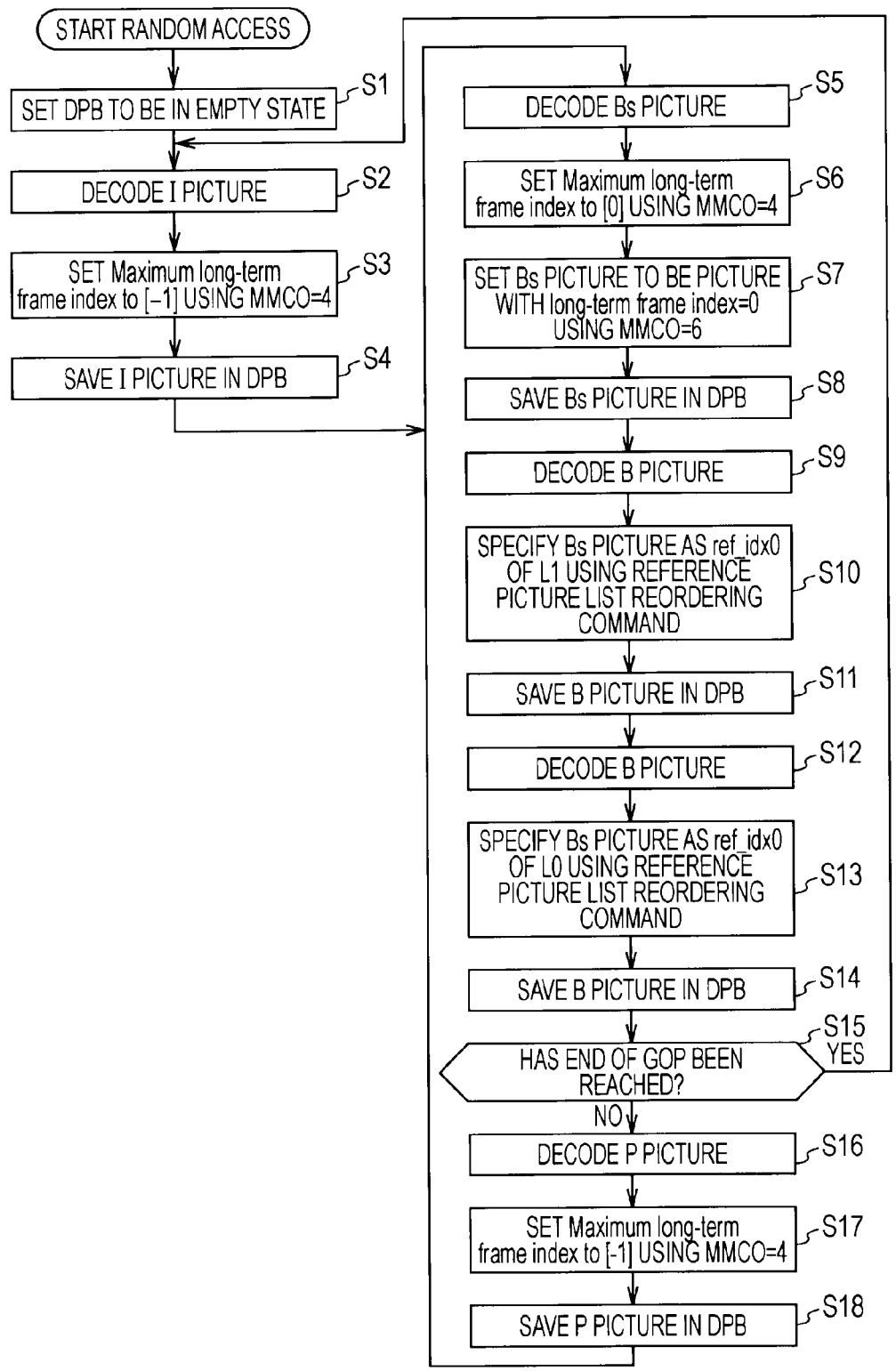
FIG. 2 is a flowchart showing a procedure for performing random access from an I picture that is not an instantaneous decoding refresh (IDR) picture in the above-mentioned picture information coding device.

And, in the picture information coding device 10, random access from an I picture that is not an instantaneous decoding refresh picture is performed in accordance with a flowchart shown in FIG. 2.

In other words, in the picture information coding device 10, when random access starts, first, in step S1, a decoded picture buffer is set to be in an empty state.

In the next step S2, a process of decoding an I picture is performed.

In the nest step S3, using a memory management control operation command (MMCO=4), the maximum value of a long-term frame index is set to [−1].

In the next step S4, the I picture is saved in the decoded picture buffer.

In the next step S5, a process of decoding a Bs picture is performed.

In the next step S6, using the memory management control operation command (MMCO=4), the maximum value of the long-term frame index is set to [0].

In the next step S7, using a memory management control operation command (MMCO=6), the long-term frame index is set to [0].

In the next step S8, the Bs picture is saved in the decoded picture buffer.

In the next step S9, a process of decoding a B picture is performed.

In the next step S10, using a reference picture list reordering command, the Bs picture is specified as ref_idx0 of L1.

In the next step S11, the B picture is saved in the decoded picture buffer.

In the next step S12, a process of decoding a B picture is performed.

In the next step S13, using a reference picture list reordering command, the Bs picture is specified as ref_idx0 of L0.

In the next step S14, the B picture is saved in the decoded picture buffer.

In the next step S15, whether the end of a GOP has been reached or not is determined.

When a result of determination in step S15 is NO, i.e., when the end of a GOP has not been reached, the flow proceeds to the next step S16. Furthermore, when a result of determination in the above-mentioned step S15 is YES, i.e., when the end of a GOP has been reached, the flow returns to the above-mentioned step S2.

In the next step S16, a process of decoding a P picture is performed.

In the next step S17, using the memory management control operation command (MMCO=4), the maximum value of the long-term frame index is set to [−1].

In the next step S18, the P picture is saved in the decoded picture buffer, and the flow returns to the above-mentioned step S5.

Then, the processes of the above-mentioned step S5 to the above-mentioned step S18 are repeatedly performed. When a result of determination in the above-mentioned step S15 is YES, i.e., when a decoding process has been performed until the end of the GOP is reached, the flow returns to the above-mentioned step S2, and an I picture of the next GOP is decoded.

Figure 3:
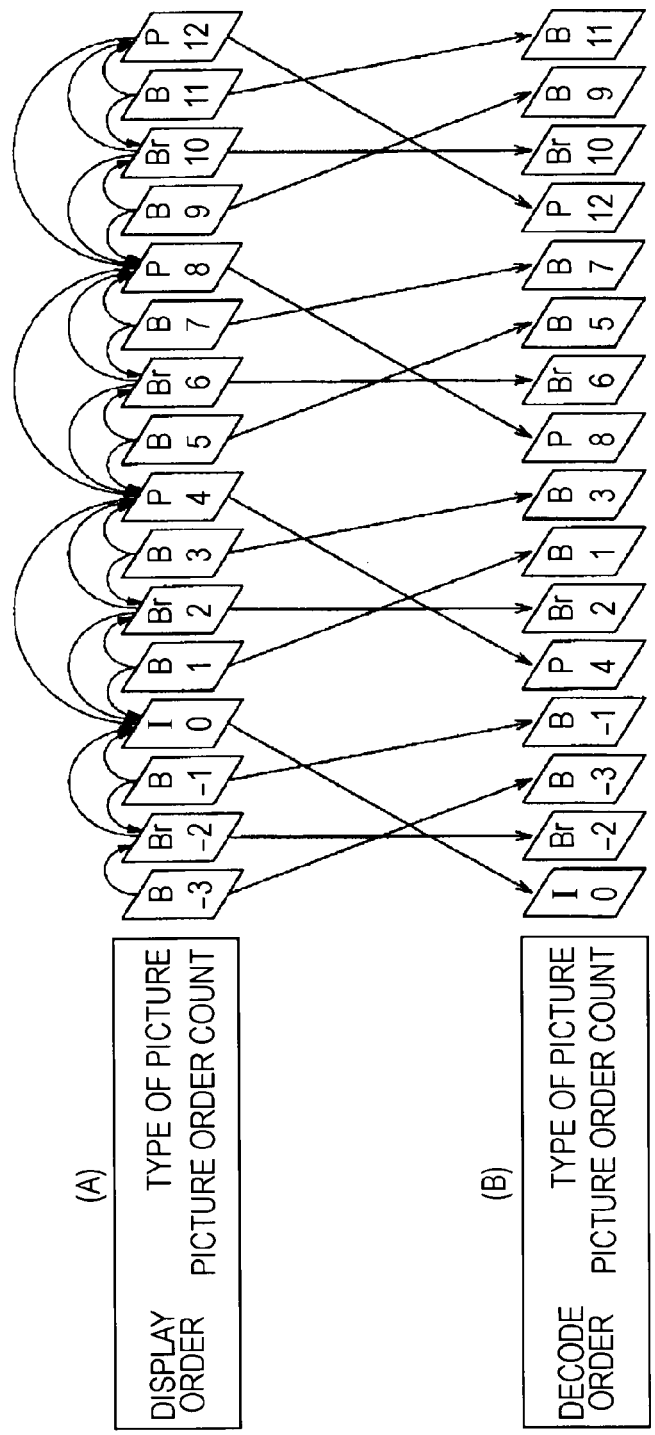
FIG. 3 is a schematic diagram showing a group-of-pictures (GOP) structure to which the above-mentioned random access is performed in the above-mentioned picture information coding device.

In other words, in the picture information coding device 10, for example, when a GOP structure is a frame structure such as a structure shown in FIG. 3 and is a hierarchical structure such as a structure in which B0, Br1, B2, I3, B4, Br5, B6, P7, B8, Br9, B10, P11, B12, Br13, B14, and P15 are provided and in which a decode order is represented by I3, Br1, B0, B2, P7, Br5, B4, B6, P11, Br9, B8, B10, P15, Br13, B12, and B14, the above-described memory management control operation command generation unit 13 generates memory management control operation commands (#COMMAND=0 to #COMMAND=6) and reference picture list reordering commands (190 COMMAND=0 to #COMMAND=3), which are defined to correspond to values of POC % 16 indicating reminders that are obtained by dividing picture order counts (POCs) by 16, as shown in FIG. 4 and FIG. 5. The memory management control operation command generation unit 13 performs the following process: sets the maximum value of the long-term frame index to [0] when I3 is processed; sets the maximum value of the long-term frame index to [1] using the memory management control operation command (MMCO=4) when Br1 is processed; sets Br1 to be a long-term reference picture; refers to I3 and Br1 using the reference picture list reordering commands when B0 is processed; and refers to I3 and Br1 using the reference picture list reordering commands when B1 is processed. The memory management control operation command generation unit 13 repeats the process, whereby random access from an I picture that is not an instantaneous decoding refresh picture can be performed without contradiction of syntax as shown in parts (A) to (D) of FIG. 6.

Here, part (A) of FIG. 6 shows types of pictures and picture order counts in a display order, and shows reference relationships among the respective pictures using arrows. Furthermore, part (B) of FIG. 6 shows a decode order of the respective pictures. Additionally, parts (C) and (D) of FIG. 6 show contents of the decoded picture buffer (reference picture buffers and a non-reference picture buffer) and a display buffer at respective times T0, T1, . . . , T15, . . . .

Figure 8:
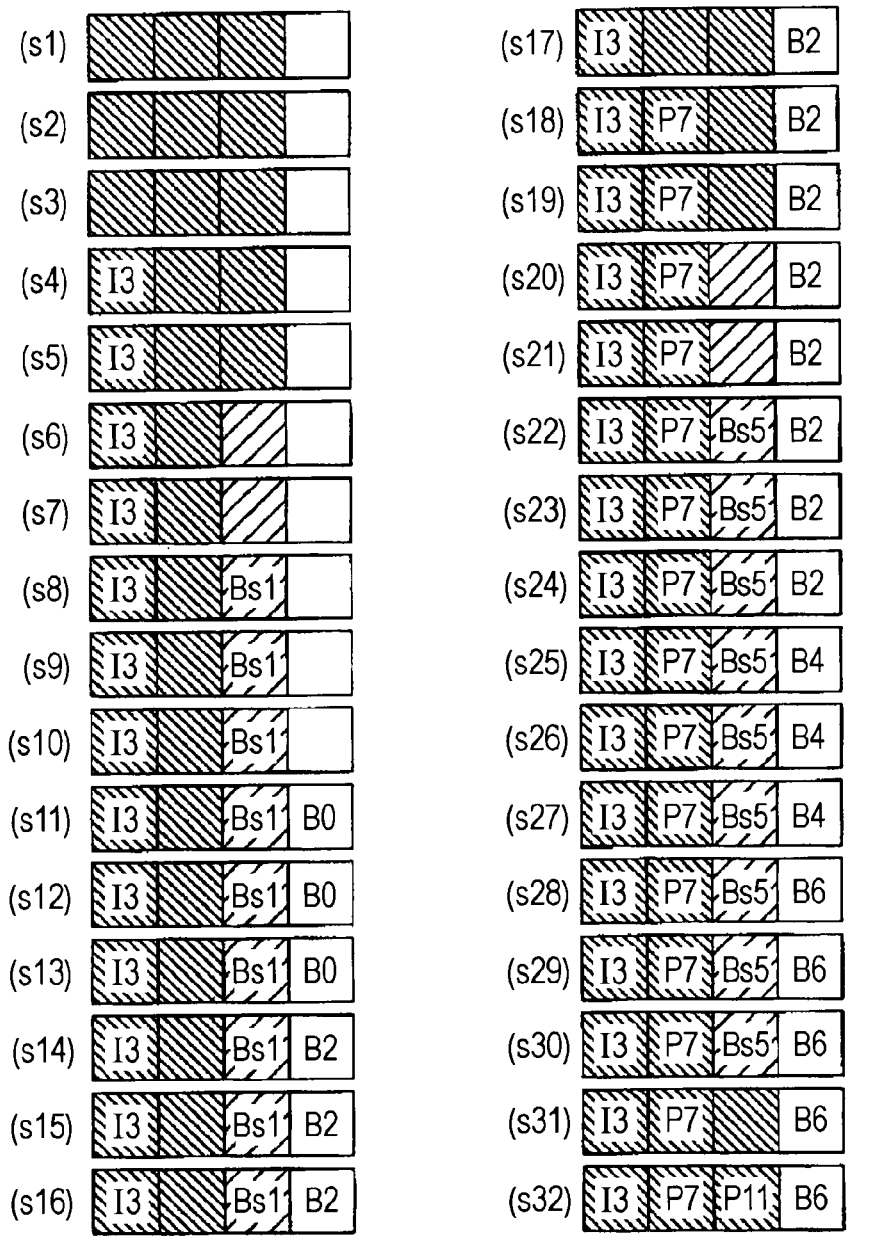
FIG. 8 is a diagram schematically showing a state of a decoded picture buffer (a short-term reference picture buffer, a long-term reference picture buffer, and a non-reference picture buffer) in a case in which the above-mentioned random access to the GOP having a frame structure is performed in the above-mentioned picture information coding device.

Moreover, for example, when a hierarchical structure such as a structure in which a display order is represented by B0, Bs1, B2, I3, B4, Bs5, B6, P7, B8, Bs9, B10, P11, . . . and in which a decode order is represented by I3, Bs1, B0, B2, P7, Bs5, B4, B6, P11, Bs9, B8, B10, . . . is provided and reference relationships indicated by arrows exist, in the picture information coding device 10, a state of the decoded picture buffer in each step becomes a corresponding state shown in FIG. 8. (s1) to (s18) shown in FIG. 8 show states of the decoded picture buffer (the short-term reference picture buffer, the long-term reference picture buffer, and the non-reference picture buffer) in the respective steps of step S1 to step S18. Furthermore, (s19) to (s32) shown in FIG. 8 show states of the decoded picture buffer (the short-term reference picture buffer, the long-term reference picture buffer, and the non-reference picture buffer) in the respective steps of step S5 to step S18 that are repeatedly performed.

As described above, when a GOP structure is a hierarchical structure such as a structure in which a B picture is referred to, the above-described memory management control operation command generation unit 13 issues MMCO commands, whereby efficient reference relationships that provide the shortest time between frames can be obtained using the limited decoded picture buffer.

Additionally, when a GOP structure is a hierarchical structure such as a structure in which a B picture is referred to, the above-described memory management control operation command generation unit 13 uses the reference picture list reordering commands, whereby efficient reference relationships that provide the shortest time between frames can be obtained using the limited decoded picture buffer.

Moreover, the memory management control operation command generation unit 13 sets a B picture, which is to be referred to, to be a long-term reference picture by utilizing an MMCO command, and releases the long-term reference picture by setting the maximum value of the long-term frame index to [0] when a P picture and an I picture is processed, whereby random access from the I picture that is not an instantaneous decoding refresh picture can be performed without contradiction of syntax.

Note that, in the embodiment of the present invention that is described above, a case in which the maximum number of decoded frame buffers (max_dec_frame_buffering) is four and the number of reference frames is three is described as an example. When a GOP structure is a frame structure, a reference picture Bs is set to be a long-term reference picture, and the long-term reference picture is released, whereby random access from an I picture that is not an instantaneous decoding refresh picture can be performed without contradiction of syntax. However, even when different values are used as the maximum number of decoded frame buffers and the number of reference frames, MMCO commands and reference picture list reordering commands for the different values are generated, whereby a stream in which there is no contradiction at all can be realized because a reference picture that does not exist in the decoded picture buffer is not specified when random access from an I picture that is not an instantaneous decoding refresh picture is performed.

Furthermore, in the embodiment of the present invention, a case in which a GOP structure is a frame structure is described. However, even in a case in which a GOP structure is a field structure, when the maximum number of decoded frame buffers (max_dec_frame_buffering) is four and the number of reference frames is three, the previous long-term reference picture is set to be a non-reference picture when a start P picture is processed. A reference picture Bs is set to be a long-term reference picture, and the long-term reference picture is released, whereby random access from an I picture that is not an instantaneous decoding refresh (IDR) picture can be performed without contradiction of syntax.

Figure 9:
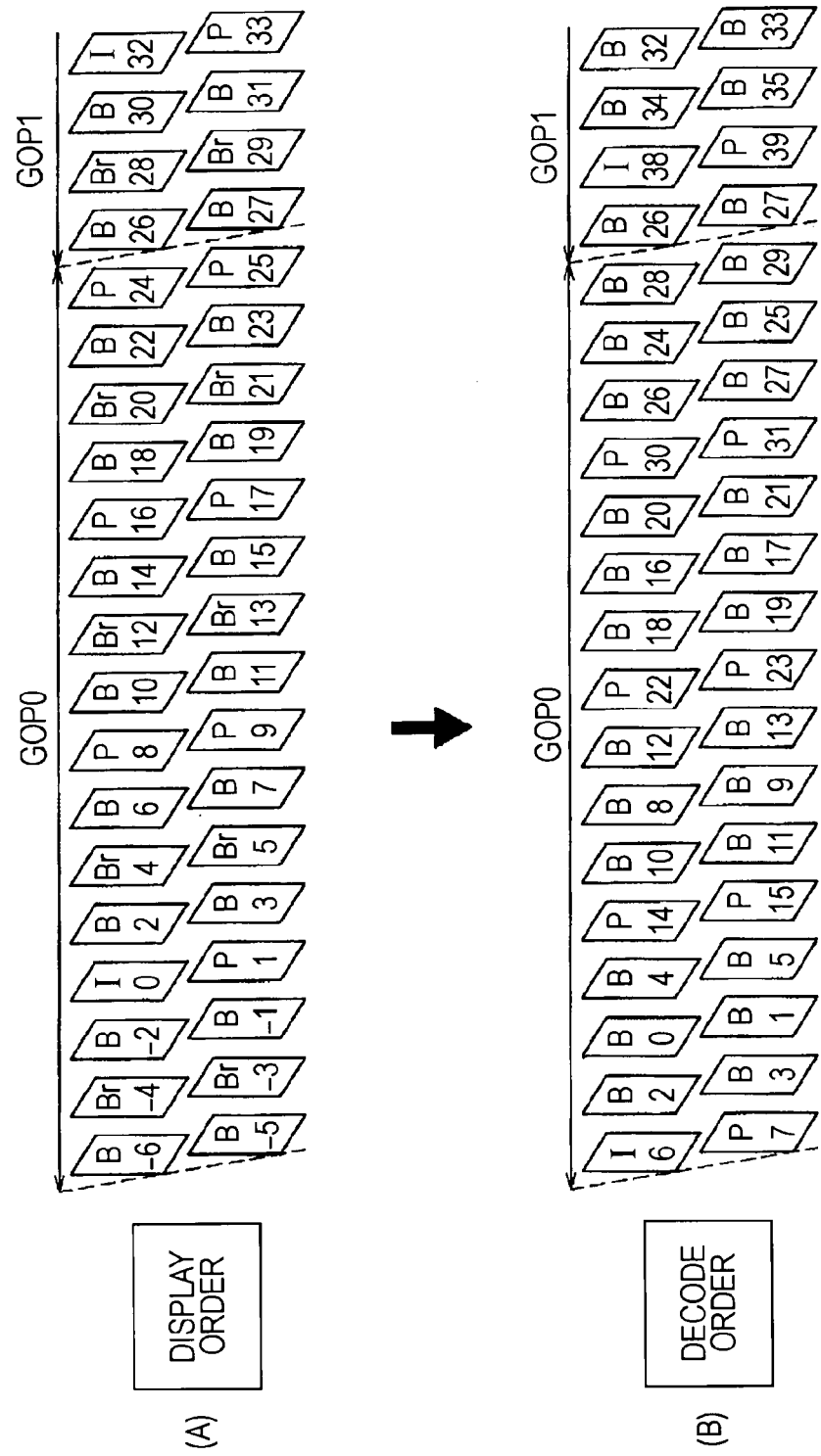
FIG. 9 is a schematic diagram showing a group of pictures (GOP) having a field structure to which the above-mentioned random access is performed in the above-mentioned picture information coding device.
Figure 12A:
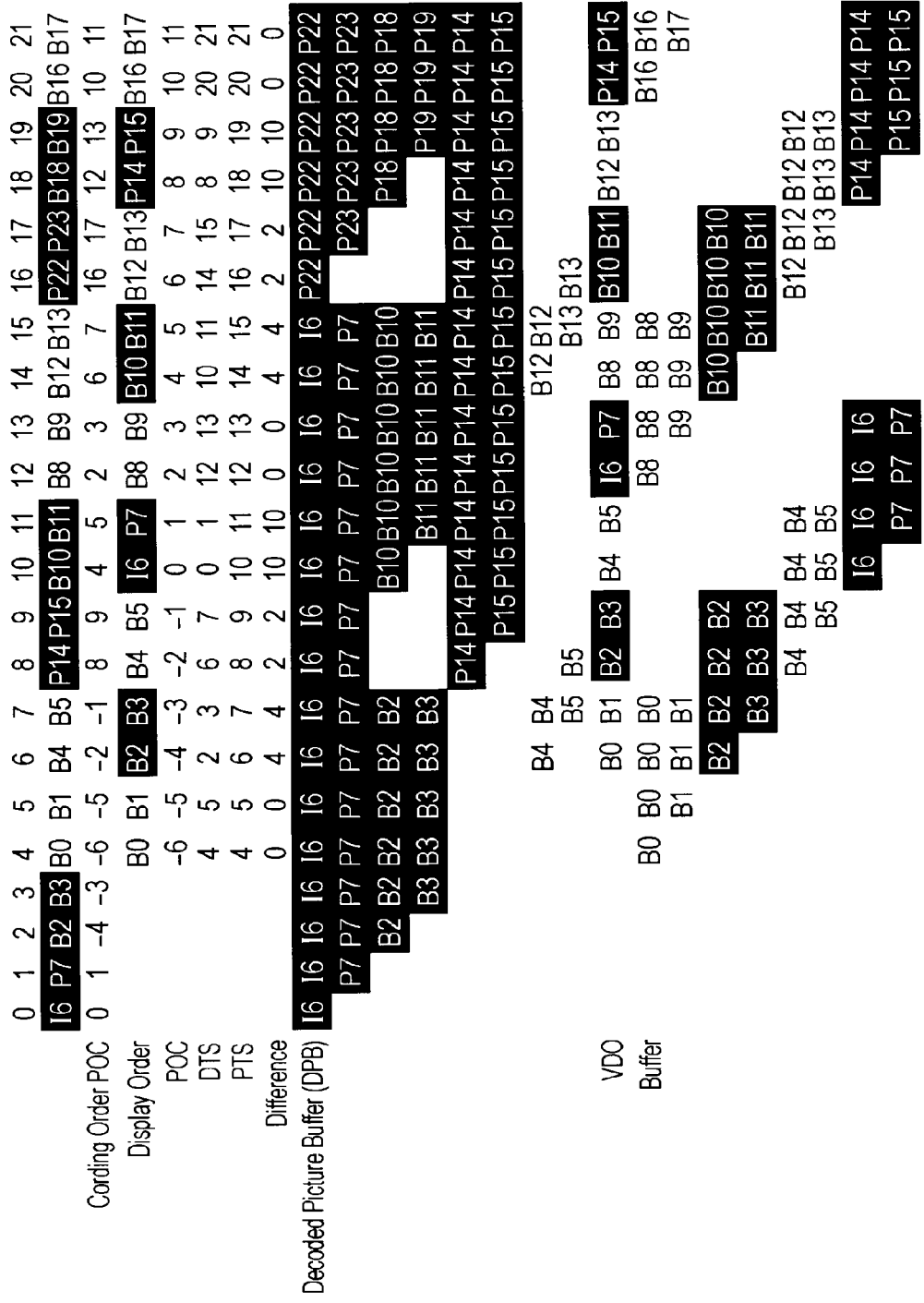
FIG. 12A is a diagram schematically showing a state of each information item in a case in which the above-mentioned random access to the GOP having a field structure is performed in the above-mentioned picture information coding device.
Figure 12B:
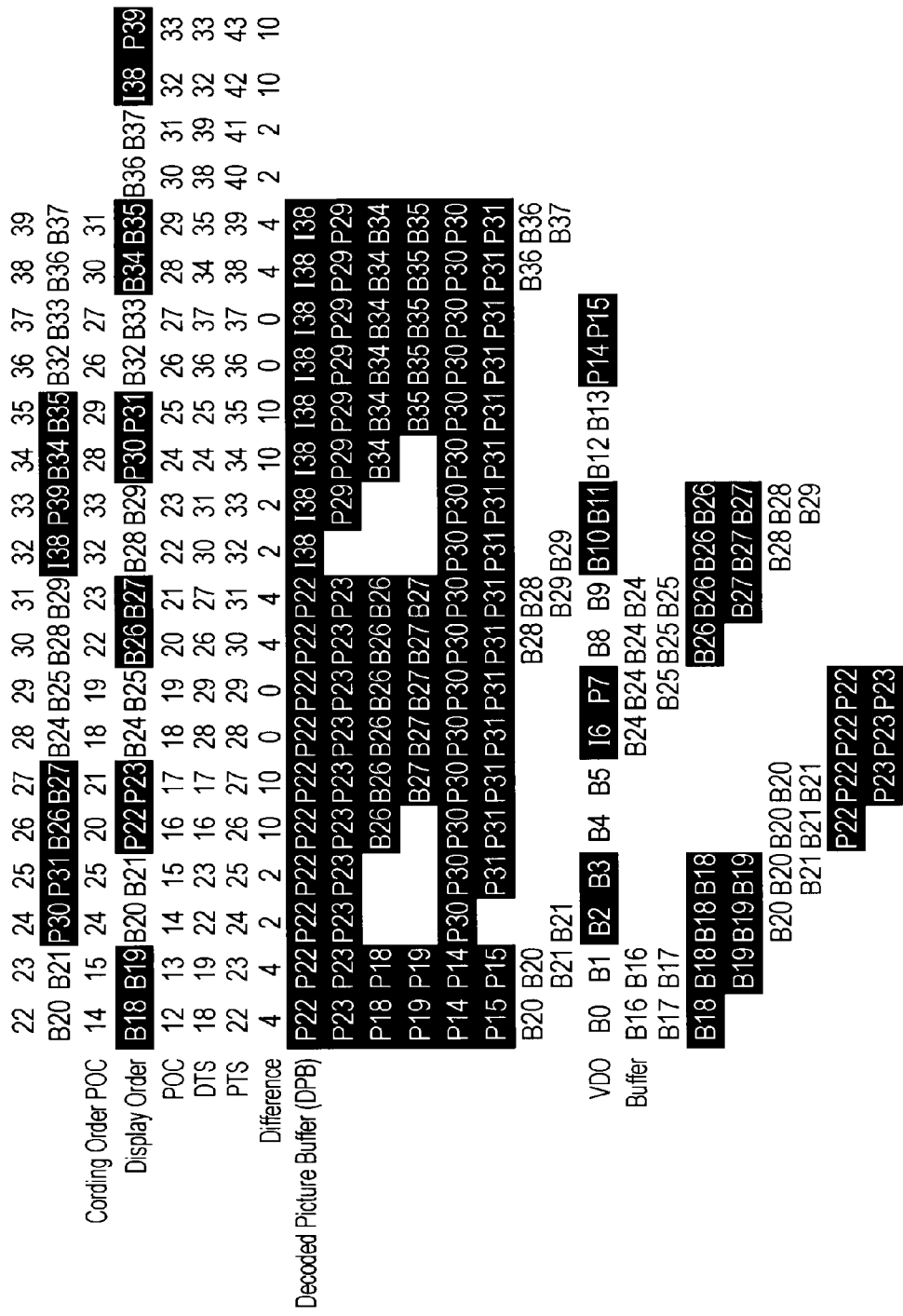
FIG. 12B is a diagram schematically showing a state of each information item in a case in which the above-mentioned random access to the GOP having a field structure is performed in the above-mentioned picture information coding device.
Figure 13:
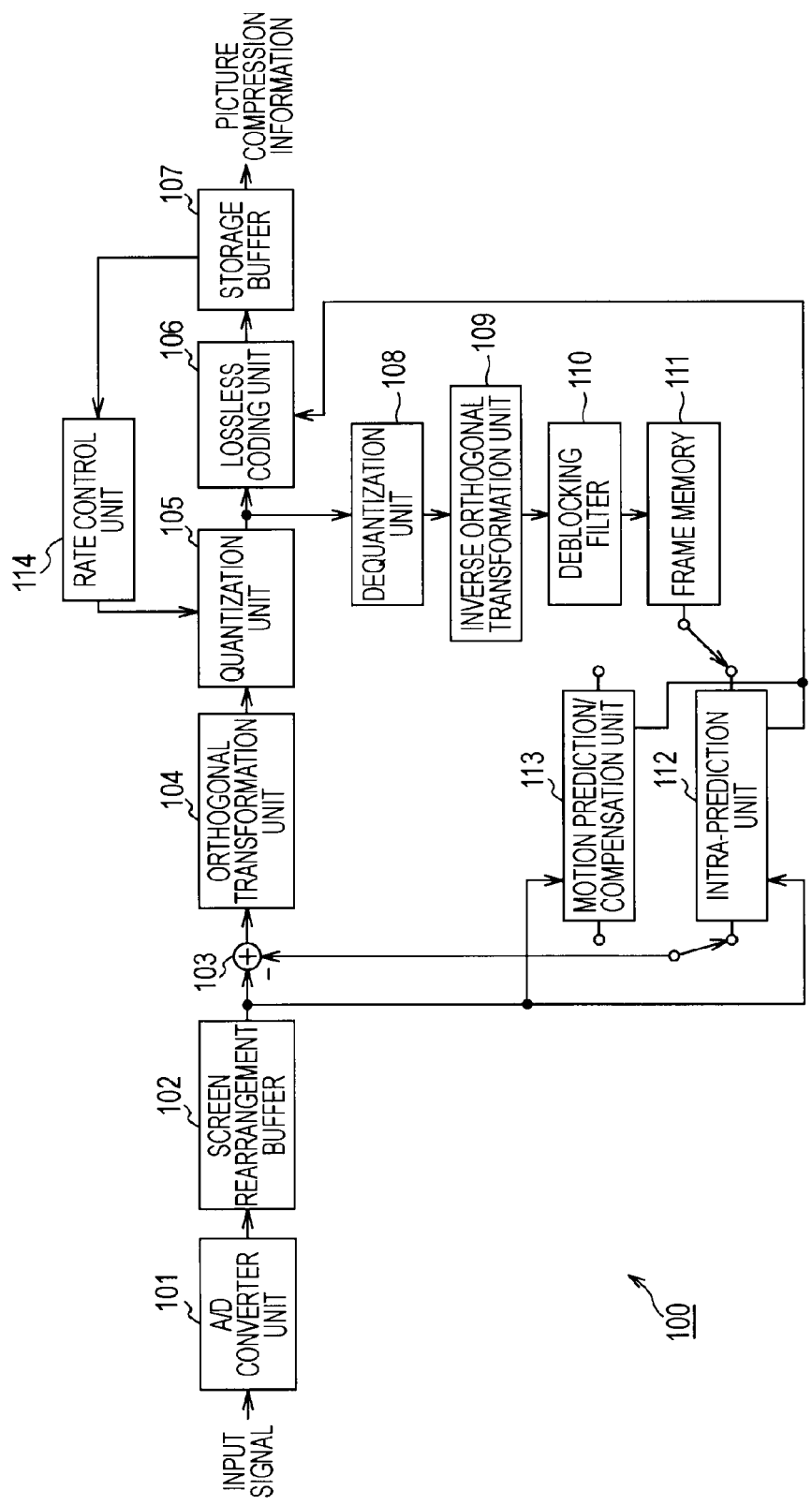
FIG. 13 is a block diagram showing an example of a configuration of a conventional picture information coding device that outputs picture compression information based on the AVC encoding scheme.
Figure 14:
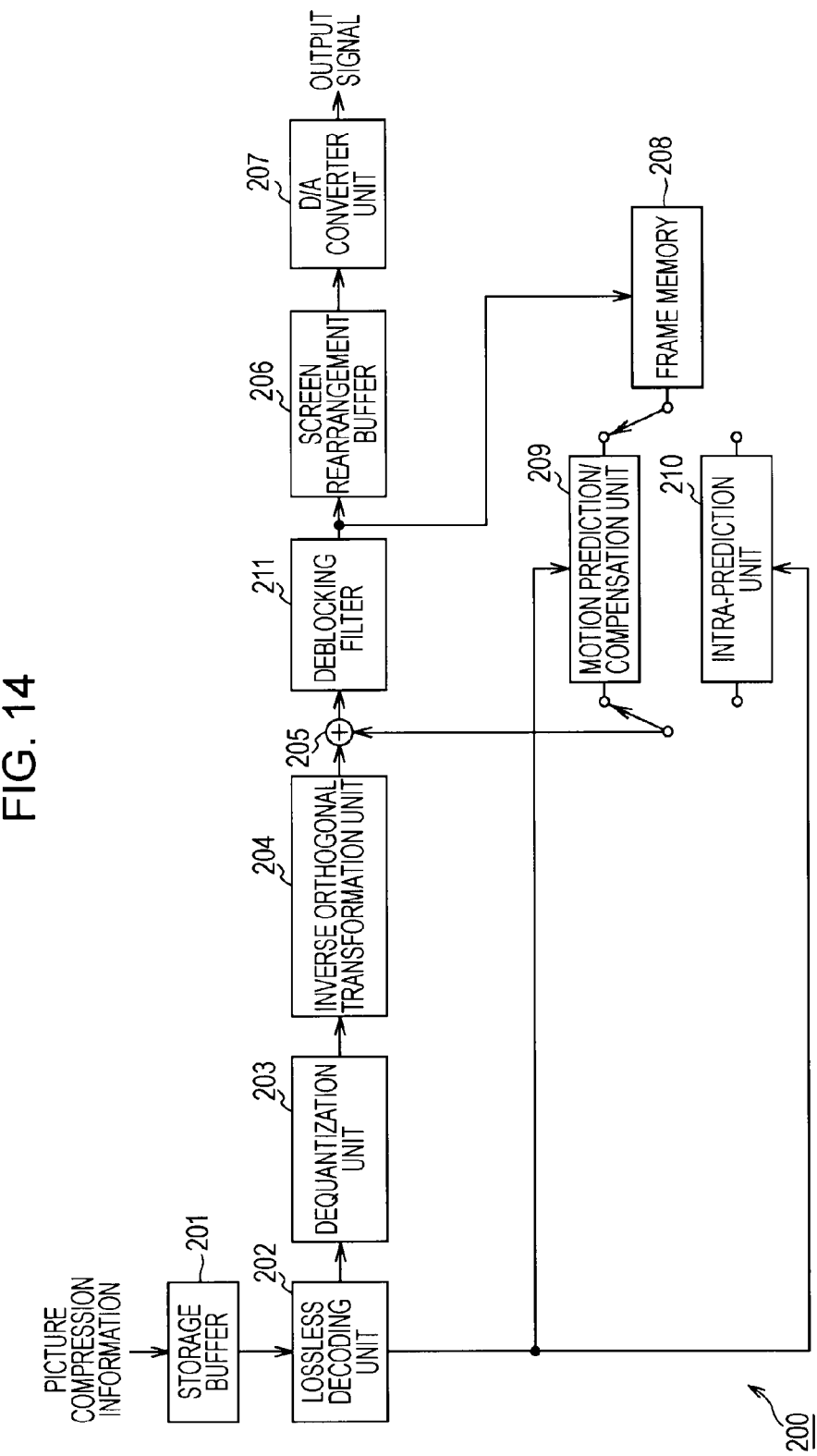
FIG. 14 is a block diagram showing an example of a configuration of a conventional picture information decoding device to which picture compression information based on the AVC encoding scheme is input.
Figure 15:
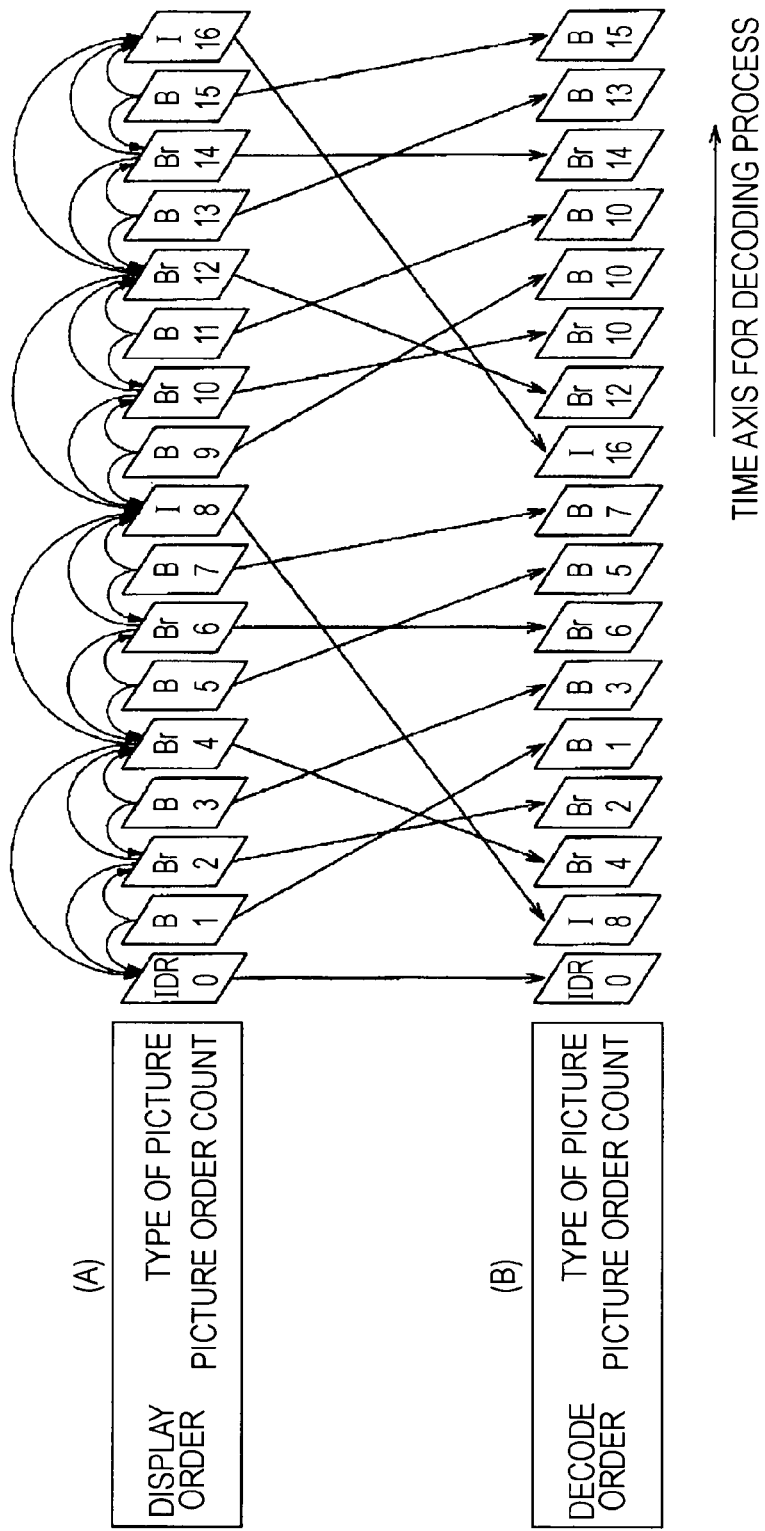
FIG. 15 is a diagram schematically showing a typical hierarchical B-picture structure.
Figure 16:
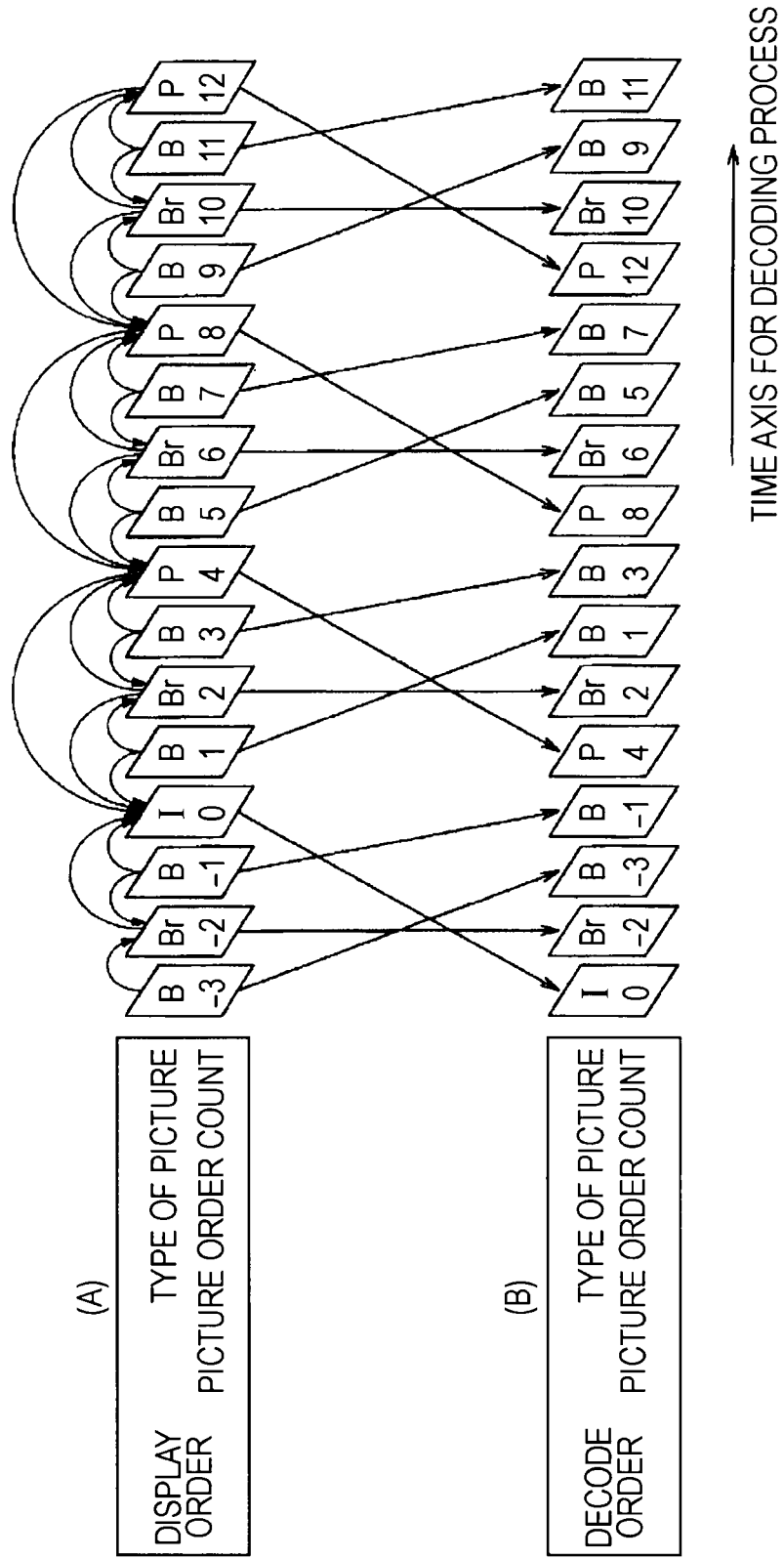
FIG. 16 is a diagram schematically showing a simplified hierarchical B-picture structure.
Figure 17:
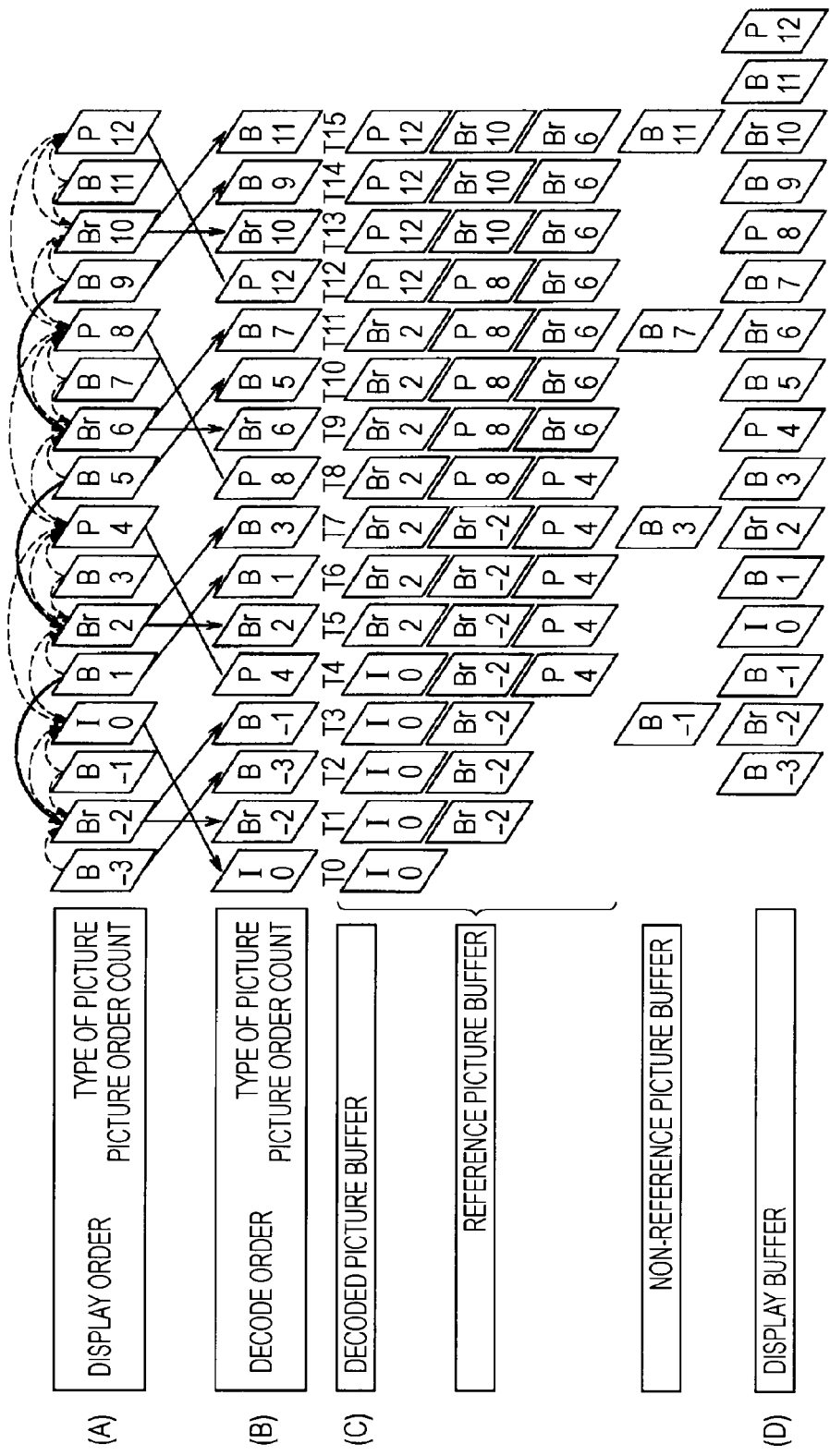
FIG. 17 is a diagram schematically showing a decoded picture buffer and reference relationships in a case in which no memory management control operation command and no reference picture list reordering command are used in the hierarchical B-picture structure.

In other words, in the picture information coding device 10, for example, when a GOP structure is a field structure such as a structure shown in FIG. 9 and is a hierarchical structure such as a structure in which B-6, B-5, Br-4, Br-3, B-2, B-1, I0, P1, B2, B3, Br4, Br5, B6, B7, P8, P9, B10, B11, Br9, B12, Br13, B14, B15, P16, P17, B18, B19, Br20, Br21, B22, B23, P24, and P25 are provided, and in which a decode order is represented by I6, P7, B2, B3, B0, B1, B4, B5, P14, P15, B10, B11, B8, B9, B12, B13, P22, P23, B18, B19, B16, B17, B20, B21, P30, P31, B2, B27, B24, B25, B28, B29, P30, P31, B32, . . . , the above-described memory management control operation command generation unit 13 generates memory management control operation commands (#COMMAND=0 to #COMMAND=6) and reference picture list reordering commands (#COMMAND=0 to #COMMAND=3), which are defined to correspond to values of POC % 32 indicating reminders that are obtained by dividing picture order counts (POCs) by 32, as shown in FIG. 10 and FIG. 11. The memory management control operation command generation unit 13 performs the following process: sets the maximum value of the long-term frame index to [0] when I6 is processed; sets the maximum value of the long-term frame index to [1] using the memory management control operation command (MMCO=4) when Br1 is processed; sets Br1 to be a long-term reference picture; refers to I6 and Br1 using the reference picture list reordering commands when B3 is processed; and refers to I6 and Br1 using the reference picture list reordering commands when B3 is processed. The memory management control operation command generation unit 13 repeats the process, whereby random access from an I picture that is not an instantaneous decoding refresh picture can be performed without contradiction of syntax as shown in FIG. 12A and FIG. 12B.

Note that, the present invention is not limited to the above-described embodiment, and, in an implementation aspect, various modifications can be made without departing from the gist of the present invention. For example, an invention is obtained by replacing a configuration of the present invention excluding the configuration of an essential portion of the present invention with a technical configuration with which advantages similar to those achieved with the configuration of the present invention excluding the configuration of the essential portion of the present invention can be achieved and which cannot be anticipated when the present invention is applied, and the invention can be included in the present invention. Furthermore, various aspects of the invention are included in the above-described embodiment, and various inventions can be realized using appropriate combinations of a plurality of disclosed elements. For example, when an invention is realized by omitting some elements from all elements that are shown in the embodiment, the omitted elements are compensated with known commonly used techniques in an aspect in which the realized invention is implemented.

Additionally, the present invention can be implemented by making various modifications without departing from the gist of the present invention.

In the present invention, when multiple-frame prediction is performed, a reference B picture that exists between a picture and a P picture or I picture is registered as a long-term reference picture using a memory management control operation command to manage a picture in the decoded picture buffer. The reference B picture is placed as the first in a reference picture list using a reference picture list reordering command when a B picture that exists between the P picture or I picture and the reference B picture is processed. The long-term reference picture in the decoded picture buffer is set to be a non-reference picture by setting the maximum value of the long-term frame index to [0] using a memory management control operation command when the P picture or I picture is processed. Random access from the I picture that is not an instantaneous decoding refresh picture is performed. Thus, by issuing the memory management control operation command to change the maximum value of the long-term frame index, the long-term reference picture can be released from the memory without specification of the long-term frame index. Because a reference picture that does not exists in the DPB is not specified when random access from the I picture that is not an instantaneous decoding refresh picture is performed, a stream in which there is no contradiction at all can be realized.

The invention claimed is:

1. A picture information coding device for performing a process of coding picture information using motion prediction and for outputting picture compression information, the device comprising:
   a memory management control operation command generation device that generates memory management control operation commands to manage pictures in a decoded picture buffer,
   wherein, in a case in which multiple-frame prediction is performed, the memory management control operation command generation device registers a reference B picture that exists between a picture and a P picture or I picture as a long-term reference picture using a memory management control operation command, places the reference B picture as the first in a reference picture list using a reference picture list reordering command when a B picture that exists between the P picture or I picture and the reference B picture is processed, sets the long-term reference picture in the decoded picture buffer to be a non-reference picture by setting a maximum value of a long-term frame index to [0] using a memory management control operation command when the P picture or I picture is processed, and performs random access from the I picture that is not an instantaneous decoding refresh picture.

2. The picture information coding device according to claim 1, wherein, in a case in which a group-of-pictures structure is a hierarchical structure in which a B picture is referred to, the memory management control operation command generation device issues a memory management control operation command to register a reference B picture that exists between a picture and a P picture or I picture as a long-term reference picture, and further sets the long-term reference picture in the decoded picture buffer to be a non-reference picture by setting a maximum value of the long-term frame index to [0] using a memory management control operation command when the P picture or I picture is processed.

3. The picture information coding device according to claim 1, wherein, in a case in which a group-of-pictures structure is a hierarchical structure in which a B picture is referred to, the memory management control operation command generation device places a reference B picture as the first in the reference picture list using a reference picture list reordering command when a B picture that exists between a P picture or I picture and the reference B picture is processed.

4. The picture information coding device according to claim 1, wherein, in a case in which a group-of-pictures structure is a hierarchical structure such as a structure in which B0, Br1, B2, I3, B4, Br5, B6, P7, B8, Br9, B10, P11, B12, Br13, B14, and P15 are provided and in which a decoding process order is represented by I3, Br1, B0, B2, P7, Br5, B4, B6, P11, Br9, B8, B10, P15, Br13, B12, and B14, the memory management control operation command generation device sets the maximum value of the long-term frame index to [0] when I3 is processed, sets the maximum value of the long-term frame index to [1] using a memory management control operation command when Br1 is processed, sets Br1 to be a long-term reference picture, refers to I3 and Br1 using reference picture list reordering commands when B0 is processed, and refers to I3 and Br1 using reference picture list reordering commands when B1 is processed, thereby performing random access from the I picture that is not an instantaneous decoding refresh picture.

5. The picture information coding device according to claim 4, wherein, by issuing a command to change the maximum value of the long-term frame index, the long-term reference picture in the decoded picture buffer is released without specification of the long-term frame index.

6. The picture information coding device according to claim 1, wherein a group-of-pictures structure is a field structure in which two fields are treated as two pictures independent of each other, and that the memory management control operation command generation device releases, by issuing a command to change the maximum value of the long-term frame index, the long-term reference picture in the decoded picture buffer without specification of the long-term frame index.

7. A picture information coding method for performing a process of coding picture information using motion prediction and for outputting picture compression information, the method comprising steps of:
   registering, in a case in which multiple-frame prediction is performed, a reference B picture that exists between a picture and a P picture or I picture as a long-term reference picture using a memory management control operation command to manage a picture in a decoded picture buffer;
   placing the reference B picture as the first in a reference picture list using a reference picture list reordering command when a B picture that exists between the P picture or I picture and the reference B picture is processed;
   setting the long-term reference picture in the decoded picture buffer to be a non-reference picture by setting a maximum value of a long-term frame index to [0] using a memory management control operation command when the P picture or I picture is processed; and
   performing random access from the I picture that is not an instantaneous decoding refresh picture.

* * * * *